(12) United States Patent
Kim et al.

(10) Patent No.: US 10,763,975 B2
(45) Date of Patent: Sep. 1, 2020

(54) METHOD FOR REDUCING OPERATION FOR REMOVING SELF-INTERFERENCE IN FDR ENVIRONMENT AND DEVICE THEREFOR

(71) Applicant: LG ELECTRONICS INC., Seoul (KR)

(72) Inventors: Dongkyu Kim, Seoul (KR); Kwangseok Noh, Seoul (KR); Sangrim Lee, Seoul (KR); Hojae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/316,021

(22) PCT Filed: Jul. 7, 2016

(86) PCT No.: PCT/KR2016/007398
§ 371 (c)(1),
(2) Date: Jan. 7, 2019

(87) PCT Pub. No.: WO2018/008780
PCT Pub. Date: Jan. 11, 2018

(65) Prior Publication Data
US 2019/0245631 A1  Aug. 8, 2019

(51) Int. Cl.
| | | |
|---|---|---|
| *H04B 15/02* | (2006.01) | |
| *H04B 7/06* | (2006.01) | |
| *H04B 7/0413* | (2017.01) | |
| *H04B 7/08* | (2006.01) | |
| *H04B 15/04* | (2006.01) | |

(Continued)

(52) U.S. Cl.
CPC ............ *H04B 15/02* (2013.01); *H04B 1/525* (2013.01); *H04B 7/06* (2013.01); *H04B 7/0617* (2013.01); *H04B 7/08* (2013.01); *H04B 15/04* (2013.01); *H04L 5/1461* (2013.01); *H04B 7/0413* (2013.01)

(58) Field of Classification Search
None
See application file for complete search history.

(56) References Cited

U.S. PATENT DOCUMENTS

| | | | |
|---|---|---|---|
| 8,934,328 B2 * | 1/2015 | Shapira ................ | H04B 7/0452 370/204 |
| 9,515,788 B2 * | 12/2016 | Agee .................... | H04B 7/0413 |
| 10,020,867 B2 * | 7/2018 | Kim ...................... | H04B 7/155 |

(Continued)

OTHER PUBLICATIONS

PCT International Application No. PCT/KR2016/007398, Written Opinion of the International Searching Authority dated Apr. 7, 2017, 22 pages.

(Continued)

*Primary Examiner* — Hong S Cho
(74) *Attorney, Agent, or Firm* — Lee Hong Degerman Kang Waimey

(57) ABSTRACT

A method by which a base station reduces an operation for removing self-interference in an FDR environment can comprise the steps of receiving estimated channel state information from a terminal, determining a beam forming value for transmission beamforming on the basis of the received channel state information, and transmitting a downlink signal by applying the determined beamforming value.

5 Claims, 13 Drawing Sheets

(51) Int. Cl.
*H04B 1/525* (2015.01)
*H04L 5/14* (2006.01)

(56) References Cited

U.S. PATENT DOCUMENTS

| | | |
|---|---|---|
| 2012/0076031 A1 | 3/2012 | Zeira |
| 2012/0201153 A1 | 8/2012 | Bharadia et al. |
| 2014/0187168 A1* | 7/2014 | Seol .................... H04B 7/0617 |
| | | 455/63.4 |
| 2016/0065290 A1 | 3/2016 | Zhu et al. |
| 2017/0272134 A1* | 9/2017 | Yuan .................... H04B 7/0452 |
| 2018/0019795 A1* | 1/2018 | Zhang ................. H04B 7/0628 |

OTHER PUBLICATIONS

Ahmed, M. et al., "Performance Analysis of Full-Duplex-MRC-MIMO With Self-Interference Cancellation Using Null-Space-Projection", IEEE Transactions on Signal Processing, vol. 64, No. 12, pp. 3093-3105, Jun. 2016, 13 pages.

* cited by examiner

METHOD FOR REDUCING OPERATION FOR REMOVING SELF-INTERFERENCE IN FDR ENVIRONMENT AND DEVICE THEREFOR

CROSS-REFERENCE TO RELATED APPLICATIONS

This application is the National Stage filing under 35 U.S.C. 371 of International Application No. PCT/KR2016/007398, filed on Jul. 7, 2016, the contents of which are all hereby incorporated by reference herein in their entirety.

TECHNICAL FIELD

The present invention relates to wireless communication, and more particularly, to a method for reducing an operation for canceling self-interference in an FDR environment and a device therefor.

BACKGROUND ART

Full-duplex communication is a technology capable of theoretically doubling the capacity of a system compared to conventional half-duplex communication in which time resources or frequency resources are orthogonally divided by performing transmission and reception simultaneously by a node.

FIG. 1 is a conceptual view of a UE and a Base Station (BS) which support Full Duplex Radio (FDR).

In the FDR situation illustrated in FIG. 1, the following three types of interference are produced.

Intra-device self-interference: Because transmission and reception take place in the same time and frequency resources, a desired signal and a signal transmitted from a BS or UE are received at the same time at the BS or UE. The transmitted signal is received with almost no attenuation at a Reception (Rx) antenna of the BS or UE, and thus with much larger power than the desired signal. As a result, the transmitted signal serves as interference.

UE to UE inter-link interference: An Uplink (UL) signal transmitted by a UE is received at an adjacent UE and thus serves as interference.

BS to BS inter-link interference: The BS to BS inter-link interference refers to interference caused by signals that are transmitted between BSs or heterogeneous BSs (pico, femto, and relay) in a HetNet state and received by an Rx antenna of another BS.

Among such three types of interference, intra-device self-interference (hereinafter, self-interference (SI)) is generated only in an FUR system to significantly deteriorate performance of the FDR system. Therefore, first of all, intra-device SI needs to be cancelled in order to operate the FDR system.

DISCLOSURE

Technical Problem

An object of the present invention is to provide a method for reducing an operation for self-interference cancellation by a base station (BS) in a full duplex radio (FDR) environment.

Another object of the present invention is to provide a method for reducing an operation for self-interference cancellation by a user equipment (UE) in a full duplex radio (FDR) environment.

Still another object of the present invention is to provide a base station (BS) for performing communication to reduce an operation for self-interference cancellation in a full duplex radio (FDR) environment.

Further still another object of the present invention is to provide a user equipment (UE) for performing communication to reduce an operation for self-interference cancellation in a full duplex radio (FUR) environment.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve one object of the present invention, a method for reducing an operation for self-interference cancellation by a base station (BS) in a full duplex radio (FDR) environment comprises receiving estimated channel state information from a user equipment (UE); determining a beamforming value for transmission beamforming based on the received channel state information; and transmitting a downlink signal by applying the determined beamforming value. The determined beamforming value may be a value determined to cancel a difference between reception (RX) beam gains per RX antenna of the UE. The determined beamforming value may be applied per transmission (TX) antenna of the BS.

To achieve another object of the present invention, a method for reducing an operation for self-interference cancellation by a user equipment (UE) in a full duplex radio (FDR) environment comprises the steps of receiving, from a base station (BS), an AoA value of a reception (RX) beam received by the BS through a signal transmitted by the UE; determining a beamforming value for transmission beamforming based on the AoA value; and transmitting an uplink signal by applying the determined beamforming value. The determined beamforming value may be a value determined to cancel a difference between reception (RX) beam gains per RX antenna of the BS. The determined beamforming value may be applied per transmission (TX) antenna of the UE.

To achieve still another object of the present invention, a method for reducing an operation for self-interference cancellation by a user equipment (UE) in a full duplex radio (FDR) environment comprises performing channel estimation for a downlink signal transmitted from a base station (BS); determining a beamforming value for transmission beamforming based on channel reciprocity property as a result of the channel estimation; and transmitting an uplink signal by applying the determined beamforming value. The determined beamforming value may be a value determined to cancel a difference between reception (RX) beam gains per RX antenna of the BS. The determined beamforming value may be applied per transmission (TX) antenna of the UE.

To achieve further still another object of the present invention, a base station (BS) for performing communication to reduce an operation for self-interference cancellation in a full duplex radio (FDR) environment comprises a receiver configured to receive estimated channel state information from a user equipment (UE); a processor configured to determine a beamforming value for transmission beamforming based on the received channel state information; and a transmitter configured to transmit a downlink signal by applying the determined beamforming value.

To achieve further still another object of the present invention, a user equipment (UE) for performing communication to reduce an operation for self-interference cancellation in a full duplex radio (FDR) environment comprises a receiver configured to receive, from a base station (BS), an AoA value of reception (RX) beam received by the BS through a signal transmitted by the UE; a processor configured to determine a beamforming value for transmission beamforming based on the AoA value; and a transmitter configured to transmit an uplink signal by applying the determined beamforming value.

To achieve further still another object of the present invention, a user equipment (UE) for performing communication to reduce an operation for self-interference cancellation in a full duplex radio (FDR) environment comprises a processor configured to perform channel estimation for a downlink signal transmitted from a base station (BS) and determine a beamforming value for transmission beamforming based on channel reciprocity property as a result of the channel estimation; and a transmitter configured to transmit an uplink signal by applying the determined beamforming value.

Advantageous Effects

In accordance with one embodiment of the present invention, a signal may be transmitted by transmission beamforming to remove a difference between RX beam gains of a receiver in an FDR environment, whereby load for operations for self-interference cancellation may be reduced.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR CARRYING OUT THE INVENTION

Figure 1:
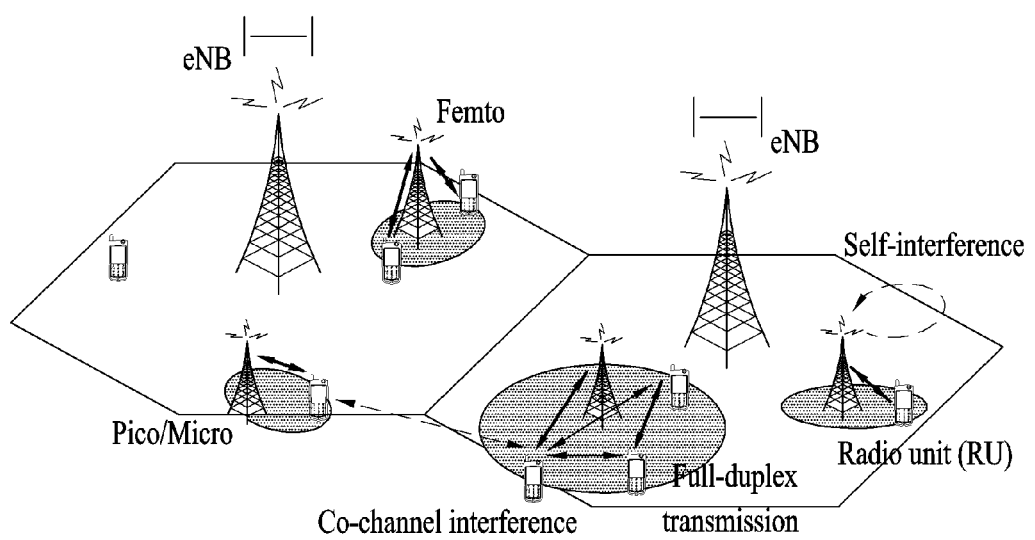
FIG. 1 is an exemplary diagram illustrating a network for supporting a full-duplex/half-duplex communication operation scheme of a UE suggested in the present invention.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

Figure 2:
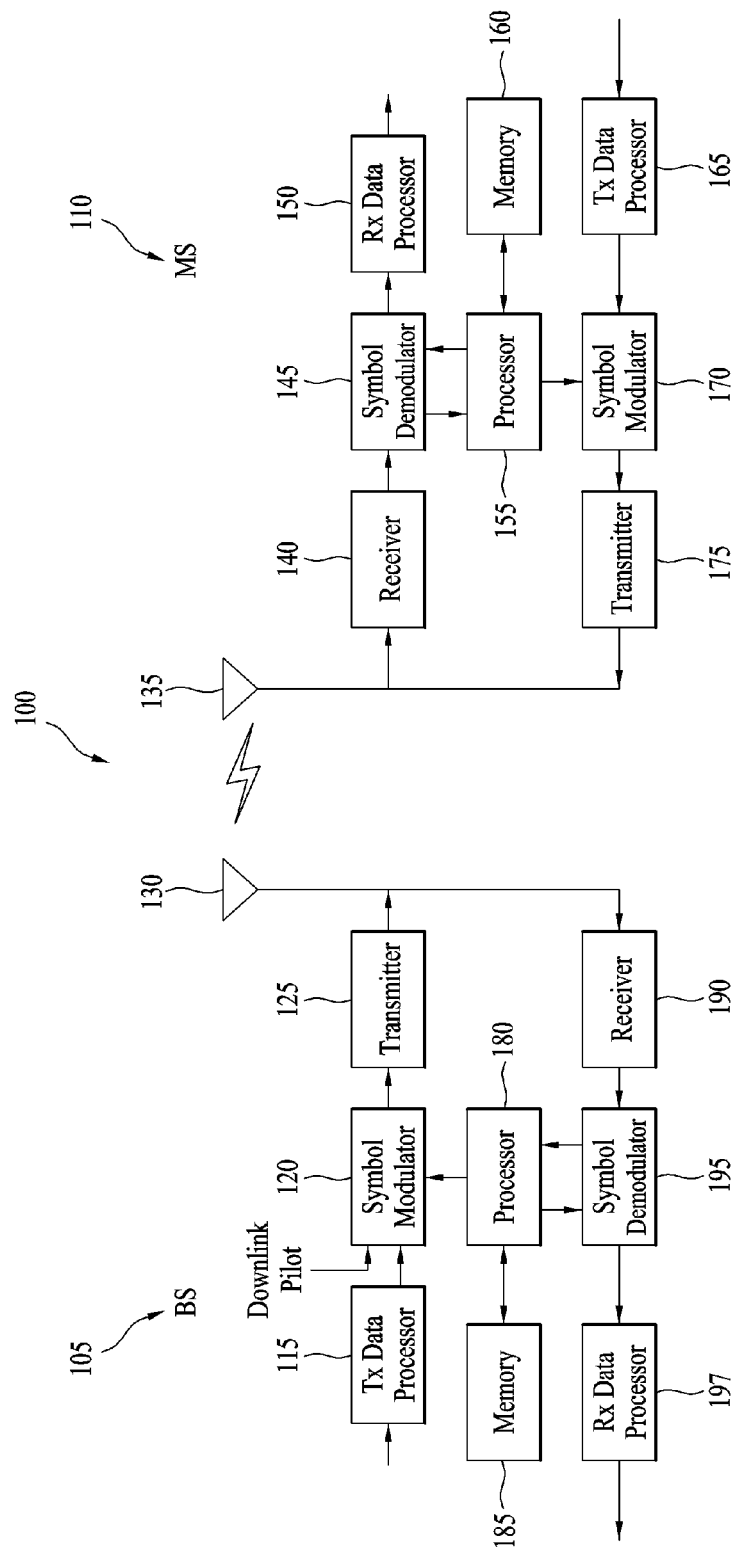
FIG. 2 is a block diagram illustrating a configuration of a base station 105 and a UE 110 in a wireless communication system 100.

FIG. 2 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 3:
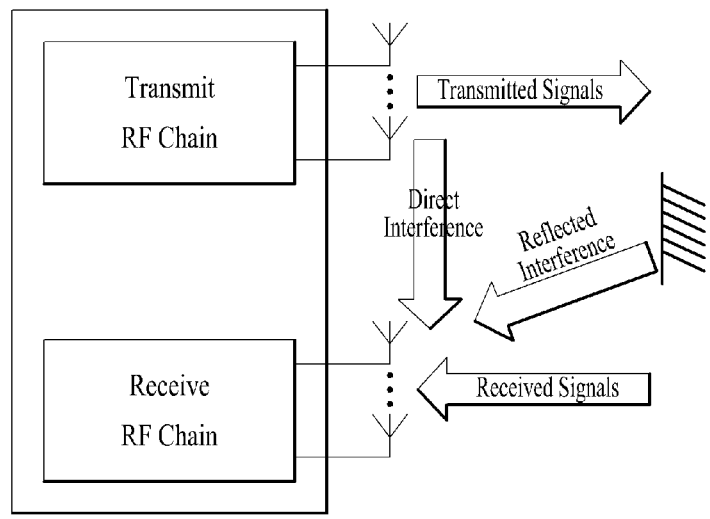
FIG. 3 is an exemplary diagram illustrating a concept of self-interference (SI) and a transmission/reception link in an FDR communication status.

FIG. 3 is a diagram showing the concept of a transmission/reception link and self-interference (SI) in an FDR communication situation.

As shown in FIG. 3, SI may be divided into direct interference caused when a signal transmitted from a transmit antenna directly enters a receive antenna without path attenuation, and reflected interference reflected by peripheral topology, and the level thereof is dramatically greater than a desired signal due to a physical distance difference. Due to the dramatically large interference intensity, efficient SI cancellation is necessary to operate the FDR system.

To effectively operate the FDR system, self-IC requirements with respect to the maximum transmission power of devices (in the case where FDR is applied to a mobile communication system (BW=20 MHz)) may be determined as illustrated in [Table 1] below.

TABLE 1

| Node Type | Max. Tx Power ($P_A$) | Thermal Noise. (BW = 20 MHz) | Receiver NF | Receiver Thermal Noise Level | Self-IC Target ($P_A$-TN-NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB |

Referring to [Table 1], it may be noted that to effectively operate the FUR system in a 20-MHz BW, a UE needs 119-dBm Self-IC performance. A thermal noise value may be changed to $N_{0,BW}$=−174 dBm+10×$\log_{10}$(BW) of a mobile communication system. In [Table 1], the thermal noise value is calculated on the assumption of a 20-MHz BW. In relation to [Table 1], for Receiver Noise Figure (NF), a worst case is considered referring to the 3GPP specification requirements. Receiver Thermal Noise Level is determined to be the sum of a thermal noise value and a receiver NF in a specific BW.

Types of Self-IC Schemes and Methods for Applying the Self-IC Schemes

Figure 4:
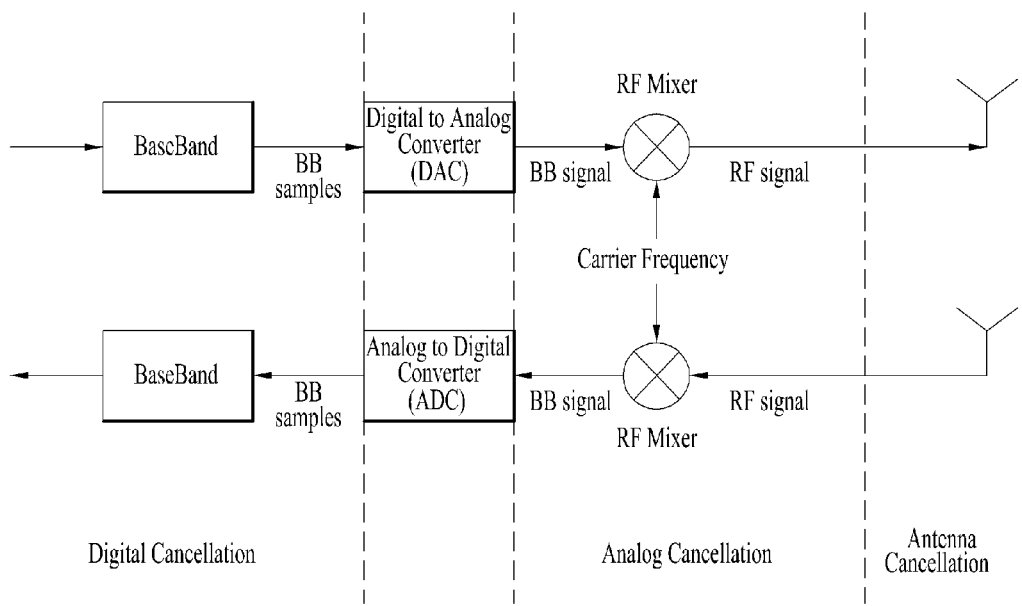
FIG. 4 is a diagram illustrating a position to which three interference schemes in an RF transceiver (or RF front end) of a device.

FIG. 4 is a view illustrating positions at which three Self-IC schemes are applied, in a Radio Frequency (RF) Tx and Rx end (or an RF front end) of a device. Now, a brief description will be given of the three Self-IC schemes.

Antenna Self-IC: Antenna Self-IC is a Self-IC scheme that should be performed first of all Self-IC schemes. SI is cancelled at an antenna end. Most simply, transfer of an SI signal may be blocked physically by placing a signal-blocking object between a Tx antenna and an Rx antenna, the distance between antennas may be controlled artificially, using multiple antennas, or a part of an SI signal may be canceled through phase inversion of a specific Tx signal. Further, a part of an SI signal may be cancelled by means of multiple polarized antennas or directional antennas.

Analog Self-IC: Interference is canceled at an analog end before an Rx signal passes through an Analog-to-Digital Convertor (ADC). An SI signal is canceled using a duplicated analog signal. This operation may be performed in an RF region or an Intermediate Frequency (IF) region. SI signal cancellation may be performed in the following specific method. A duplicate of an actually received SI signal is generated by delaying an analog Tx signal and controlling the amplitude and phase of the delayed Tx signal, and subtracted from a signal received at an Rx antenna. However, due to the analog signal-based processing, the resulting implementation complexity and circuit characteristics may cause additional distortion, thereby changing interference cancellation performance significantly.

Digital Self-IC: Interference is canceled after an Rx signal passes through an ADC. Digital Self-IC covers all IC techniques performed in a baseband region. Most simply, a duplicate of an SI signal is generated using a digital Tx signal and subtracted from an Rx digital signal. Or techniques of performing precoding/postcoding in a baseband using multiple antennas so that a Tx signal of a UE or an eNB may not be received at an Rx antenna may be classified into digital Self-IC. However, since digital Self-IC is viable only when a digital modulated signal is quantized to a level enough to recover information of a desired signal, there is a need for the prerequisite that the difference between the signal powers of a designed signal and an interference signal remaining after interference cancellation in one of the above-described techniques should fall into an ADC range, to perform digital Self-IC.

Figure 5:
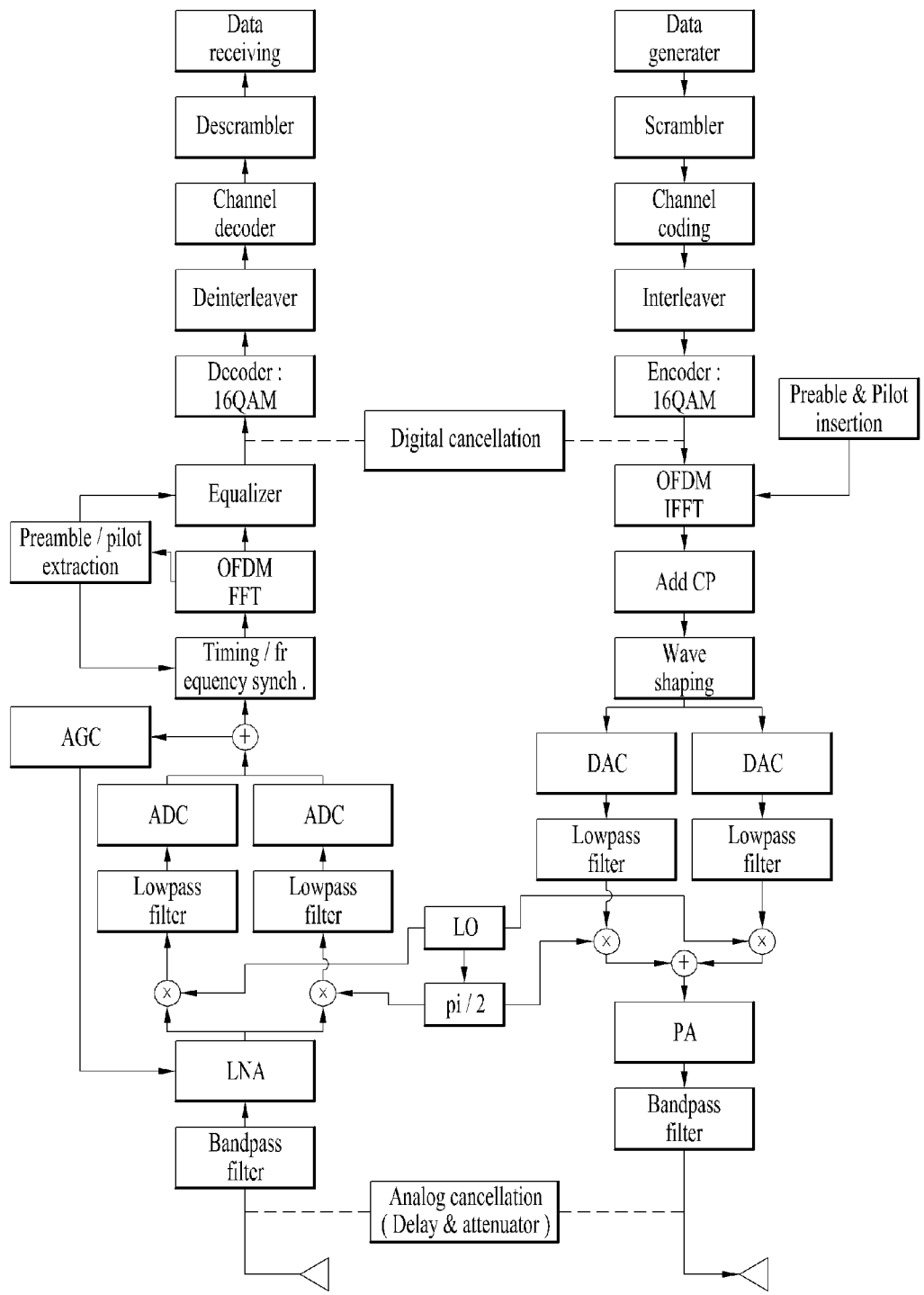
FIG. 5 is a block diagram illustrating a device for self-interference cancellation in a communication device suggested in a communication system environment using OFDM based on FIG. 4.

FIG. 5 is a block diagram of a Self-IC device in a proposed communication apparatus in an OFDM communication environment based on FIG. 4.

While FIG. 5 shows that digital Self-IC is performed using digital SI information before Digital to Analog Conversion (DAC) and after ADC, it may be performed using a digital SI signal after Inverse Fast Fourier Transform (IFFT) and before Fast Fourier Transform (FFT). Further, although FIG. 5 is a conceptual view of Self-IC though separation of a Tx antenna from an Rx antenna, if antenna Self-IC is performed using a single antenna, the antenna may be configured in a different manner from in FIG. 5. A functional block may be added to or removed from an RF Tx end and an RF Rx end shown in FIG. 5 according to a purpose.

Signal Modeling of FDR System

Since the FDR system uses the same frequency for the Tx signal and the Rx signal, non-linear components of the RF are greatly affected. In particular, Tx signals are distorted due to nonlinear characteristics of active apparatuses such as the power amplifier (PA) and the low noise amplifier (LNA). Due to such distortions, modeling of the Tx signal may include high-order components. Thereamong, even-order components, which affect DC periphery, can be effectively removed using the conventional AC coupling or filtering technique. However, the odd-order components, which appear in the vicinity of an existing frequency, are not easily removed compared to the even-order components, and have a great influence upon reception. Considering these nonlinear characteristics of the odd-order components, the Rx signal after the ADC in the FDR system may be represented by Equation 1 below, using the parallel Hammerstein (PH) model.

$$y(n) = \\ h_D(n) * x_D(n) + \sum_{\substack{k=1,\ldots,K \\ k=odd}} h_{SI,k}(n) * |x_{SI}(n)|^{k-1} x_{SI}(n) + z(n)$$ [Equation 1]

In Equation 1, k has an odd number value, $x_{SI}[n]$ indicates data transmitted at an RF transmitting end of the apparatus, $h_{SI}[n]$ indicates a gain of a self-interference channel (self-channel) through which the data transmitted at the RF transmitting end passes, $x_D[n]$ indicates data which an RF end of the apparatus desires to receive, $h_D[n]$ indicates a gain of a desired channel through which the data that the RF end desires to receive passes, and z[n] indicates Additive White Gaussian Noise (AWGN). In this case, if k is equal to 1, it corresponds to a linear component. If k is an odd number equal to or greater than 3, it corresponds to a nonlinear component.

In the FDR system, the power of self-interference increases as transmit power increases. Therefore, if the performance of the antenna self-IC and the analog self-IC is fixed, more self-IC components should be removed in digital self-IC in order to achieve desired target self-IC performance when the Tx power increases.

When the transmit power of the apparatus driven in the FDR scheme increases, the power of nonlinear SI components generated according to the characteristics of the FDR apparatus increases with a higher rate of increase than the linear SI components. The correlation between change in Tx power and the power of the linear SI component and the power of the nonlinear SI component may be expressed as shown in FIG. 6.

Figure 6:
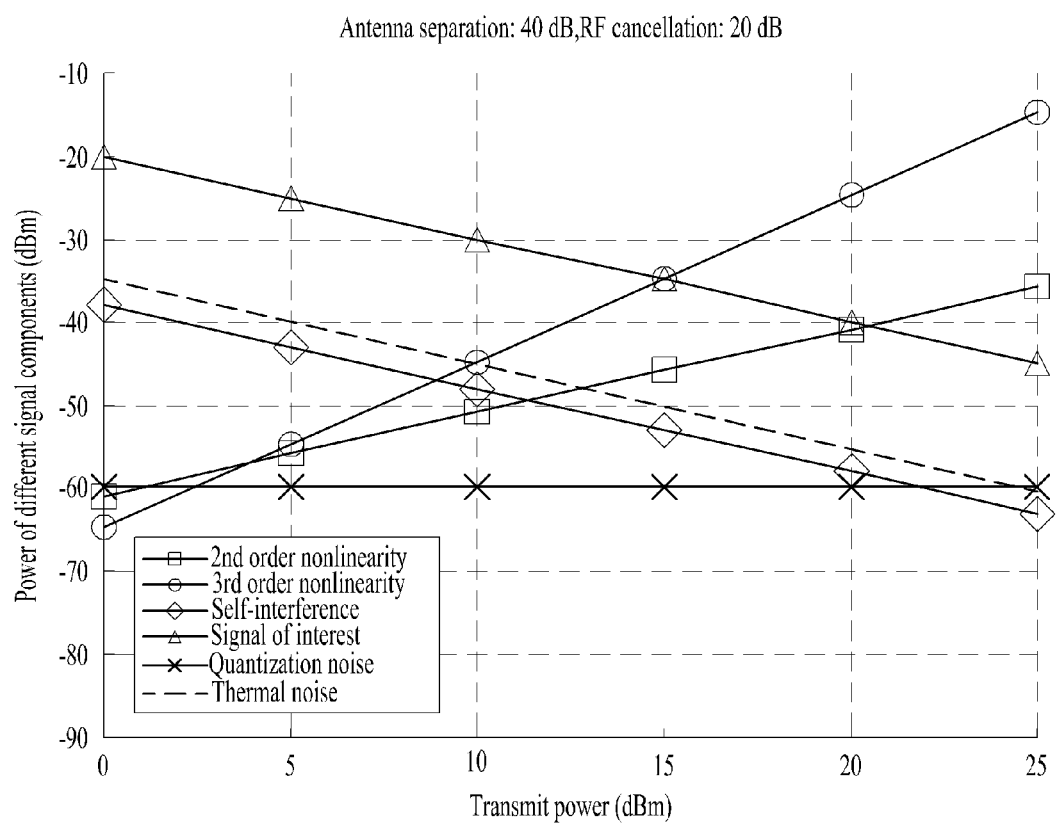
FIG. 6 is a diagram illustrating a difference in a power between respective self-interference (SI) components in an FDR system according to a change of a transmission power.

FIG. 6 is a diagram showing a difference in power between respective SI components in the FDR system according to change of transmit power.

As shown in FIG. 6, when the transmit power is low (10 dBm or less), the power of the second-order nonlinear SI component (square marker) and the power of the third-order nonlinear SI component (circle marker) are below the thermal noise (dotted line), and therefore the desired self-IC performance may be obtained by digital self-interference cancellation alone considering only the linear SI components.

However, as the transmit power increases (beyond 10 dBm), the power of the second-order nonlinear SI component and the power of the third-order nonlinear SI component increase significantly over the thermal noise. Further, since the power of the nonlinear SI component increases over the power of the desired signal, the desired self-IC performance may not be obtained with digital self-interference cancellation considering only the linear SI component.

Moreover, it is evident that the SINR at the time of reception will be significantly lowered due to self-interference of high-order components which have not been removed. Therefore, when the transmit power increases, the powers of the linear and nonlinear SI components also increase, and accordingly nonlinear digital self-interference cancellation should be designed considering even the nonlinear SI components, that have not been considered previously, in order to stably operate the FDR system.

Generally, when a pilot signal (or reference signal) is transmitted in the LTE system, its transmit power is power-boosted (e.g., 3 dB boosting) compared to data transmit power to improve channel estimation performance. If the receiving end fails to correctly understand the pilot power configured for the transmission, the receiving end performs channel estimation and data decoding based on the misunderstood boosted pilot power, and it causes degradation of transmission performance due to a channel estimation error, which results from the erroneous power difference. That is, to prevent this performance degradation, the amount of boosted power for the pilot signal transmission should be accurately known to both the transmitting and receiving ends. To this end, the legacy 3GPP LTE system is designed to inform a UE of pilot booting information using RS EPRE (energy per resource element) through downlink signaling. It will be described in detail later. Table 2 below shows EPRE/PDSCH EPRE described in 3GPP TS 36.213.

TABLE 2

The eNodeB determines the downlink transmit energy per resource element.
A UE may assume downlink cell-specific RS EPRE is constant across the downlink system bandwidth and constant across all subframes until different cell-specific RS power information TABLE 2-continued is received. The downlink reference-signal EPRE can be derived from the downlink reference-signal transmit power given by the parameter Reference-signal-power provided by higher layers. The downlink reference-signal transmit power is defined as the linear average over the power contributions (in [W]) of all resource elements that carry cell-specific reference signals within the operating system bandwidth.

The ratio of PDSCH EPRE to cell-specific RS EPRE among PDSCH REs (not applicable to PDSCH REs with zero EPRE) for each OFDM symbol is denoted by either $\rho_A$ or $\rho_B$ according to the OFDM symbol index as given by Table 5.2.-2. In addition, $\rho_A$ or $\rho_B$ are UE specific.

The UE may assume that for 16QAM, 64QAM, TRI>1 spatial multiplexing or for PDSCH transmission associated with the multi-user MIMO transmission mode.

$\rho_A$ is equal to $\delta_{power-offset}$ when the UE receives a PDSCH data transmission using precoding for transmit diversity with 4 cell-specific antenna ports according to Section 6.3.4.3 of [3]

$\rho_A$ is equal to $\delta_{power-offset} + P_A$

Where $\delta_{power-offset}$ is 0 dB for all transmission modes except multi-user MIMO and where $P_A$ is a UE specific parameter provided by higher layers.

If UE-specific RSs are present in a PRB, the ratio of PDSCH EPRE to UE-specific RS EPRE for each OFDM symbol is equal. In addition, the UE may assume that for 16QAM or 64QAM, this ratio is 0 dB.

The cell-specific ratio $\rho_B/\rho_A$ is given by following Table 3 according to cell-specific parameter $P_B$ signaled by higher layers and the number of configured eNodeB cell specific antenna ports.

TABLE 3

| $P_B$ | $\rho_B/\rho_A$ | |
| --- | --- | --- |
| | One antenna port | Two and four antenna ports |
| 0 | 1 | 5/4 |
| 1 | 4/5 | 1 |
| 2 | 3/5 | 3/4 |
| 3 | 2/5 | 1/2 |

Table 3: The cell-specific ratio $\rho_B/\sigma_A$ for 1,2, or 4 cell specific antenna ports Table 4 shows OFDM symbol indices within a slot where the ratio of the corresponding PDSCH EPRE to the cell-specific RS EPRE is denoted by $\rho_A$ or $\rho_B$.

TABLE 4

| | OFDM symbol indices within a slot where the ratio of the corresponding PDSCH EPRE to the cell-specific RS EPRE is denoted by $\rho_A$ | | OFDM symbol indices within a slot where the ratio of the corresponding PDSCH EPRE to the cell-specific RS EPRE is denoted by $\rho_B$ | |
| --- | --- | --- | --- | --- |
| Number of antenna ports | Normal cyclic prefix | Extended cyclic prefix | Normal cyclic prefix | Extended cyclic prefix |
| One or two | 1, 2, 3, 5, 6 | 1, 2, 4, 5 | 0, 4 | 0, 3 |
| Four | 2, 3, 5, 6 | 2, 4, 5 | 0, 1, 4 | 0, 1, 3 |

TABLE 5

```
-- ASN1START
CQI-ReportConfig ::=              SEQUENCE {
    cqi-ReportModeAperiodic           ENUMERATED {
    rm12, rm20, rm22, rm30, rm31,
    spare3, spare2, spare1} OPTIONAL,
                                      -- Need OR
    nomPDSCH-RS-EPRE-Offset           INTEGER (-1..6),
    cqi-ReportPeriodic                OPTIONAL
    -- Need ON
}
```

Table 5 below shows CQI-ReportConfig information elements including normal PUSCH-RS-EPRE offset values in the LTE system. The CQI-ReportConfig information elements are signaled by the BS to the UE through higher layer signaling (e.g., RRC signal).

TABLE 6

```
-- ASN1START
PDSCH-ConfigCommon::=           SEQUENCE {
    referenceSignalPower               INTEGER (-60..50),
    p-b                                INTEGER (0..3)
}
PDSCH-ConfigDedicated::=        SEQUENCE {
    p-a                                ENUMERATED {
                                       dB-6,dB-4dot77, dB-3, dB-1dot77,
dB0, dB1, dB2, dB3 }}
```

Table 6 below shows a PDSCH-Config information element. The BS signals the PDSCH-Config information element to the UE through higher layer signaling (e.g., RRC signal). The values of $P_A$ and $P_B$ described in Table 2 are included in the PDSCH-Config information element.

TABLE 7

```
-- Cell Specific --
referenceSignalPowerINTEGER (-60..50)
p-b    INTEGER (0..3)
-- UE Specific --
p-a    ENUMERATED {dB-6, dB-4dot77, dB-3, dB-1dot77, dB0, dB1,
dB2, dB3 }
```

It can be seen from Table 7 that $P_B$ is a cell-specific value, and PA is a user-specific value.

The power of the cell-specific reference signal has a cell-specific value (i.e., it is constant across the downlink bandwidth), and the data power has a UE-specific value. In addition, the RS power is given as an integer value, and the data power is expressed as a ratio compared to the RS power. There are two types of data power: one is the power of the PDSCH with no RS and the other one is the power of the PDSCH with an RS.

The RS power is expressed as an integer in the range of −60 to 50. In the case of the data power, $\rho_A$ is expressed as a ratio of cell-specific RS EPRE ($P_{CRS}$) to PDSCH EPRE ($P_{Data\_NRS}$) of the symbol with no RS (i.e., $P_{CRS}/P_{Data\_NRs}$), and $\rho_B$ is expressed as a ratio of cell-specific RS EPRE ($P_{CRS}$) to PDSCH EPRE ($P_{Data\_RS}$) of the symbol with an RS (i.e., $P_{CRS}/P_{Data\_RS}$).

In the case of data demodulation, a ratio of RS EPRE to data EPRE is considered as an important value. The ratio of RS to data of the symbol with no RS, $\rho_A$ is transmitted from the BS to the UE through higher layer signaling. On the other hand, the ratio of RS to data of the symbol with an RS, $\rho_B$ can be calculated using $\rho_A$, which is given in a UE-specific manner, and $P_B$, which is given in a cell-specific manner. That is, in the environment where the cell-specific RS is used, the RS EPRE is a cell-specific value and the data EPRE is a UE-specific value.

In the case of one antenna port in Table 3, an RB in the OFDM symbol with an RS is composed of 2 REs for the RS and 10 REs for data. In this case, to boost RS power, it is possible to uniformly extract power from 5 data REs and then use the extracted power to increase the RS power. For example, assuming that the energy transmitted in each RE is 1, by reducing the energy in each of the 5 data REs by 1/5 and increasing the energy in an RS RE by 1, the RS power can be increased by 3 dB. In this case, since the energy of each of the data REs in the OFDM symbol with the RS becomes 4/5, and the energy of each data RE in the OFDM symbol with no RS is still 1, the ratio of data EPRE in the OFDM symbol with the RS to data EPRE in the OFDM symbol with no RS (i.e., EPRE for data in OFDM symbol with RS to EPRE for data in OFDM symbol without RS ratio) can be expressed as 4/5.

In the case of two/four antenna ports, an RB in the OFDM symbol with an RS is composed of 4 REs for the RS and 8 REs for data. In this case, the 4 RS REs can be separately used as follows: two REs are used for a certain antenna and the remaining two REs are used for another antenna. From the perspective of a Tx antenna, the RS (RS1) for estimating a channel of the certain antenna is transmitted on the RE corresponding to RS1 through the corresponding antenna, and '0' energy is transmitted on the RE for the RS (RS2) for another antenna. As described above, the unused energy may be used for data transmission or RE transmission for RS1. In the case of '1' energy for RS 2, since the energy of each of 4 data REs may be increased by 1/4, that is, the energy transmitted on each of the data REs becomes 5/4, the ratio with EPRE of the data RE in the OFDM symbol with no RS can be expressed as 5/4. When the energy for RS2 is used for RS1 transmission, EPRE of RS1 becomes a double of the data EPRE in the OFDM symbol with no RS (=3 dB), and the ratio of the data EPRE in the OFDM symbol with the RS to the EPRE for data in the OFDM symbol with no RS becomes '1' ($P_B$=1).

FIGS. 7a to 7e are diagrams for explaining RS EPRE/PDSCH EPRE described in 3GPP TS 36.213.

Figure 7A:
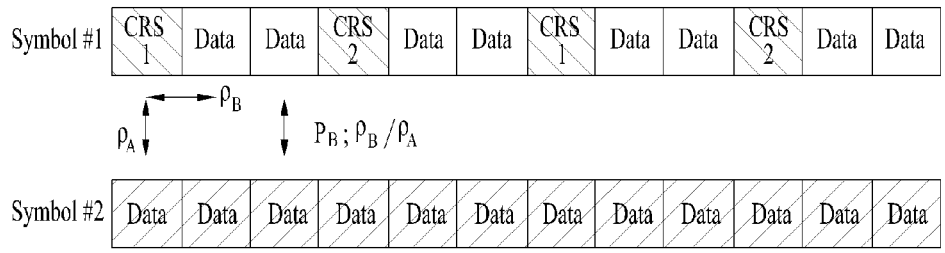
FIGS. 7a to 7e are exemplary diagrams illustrating a disclosure of RS EPRE/PDSCH EPRE disclosed in 3GPP TS 36.213.
Figure 7B:
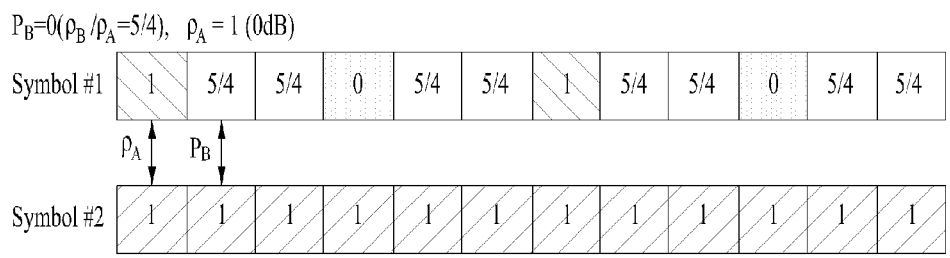
Figure 7C:
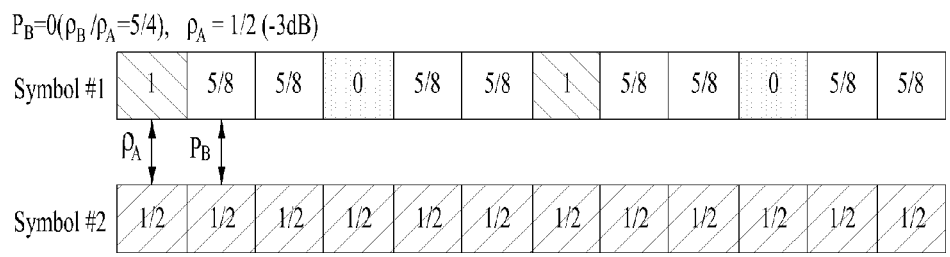
Figure 7D:
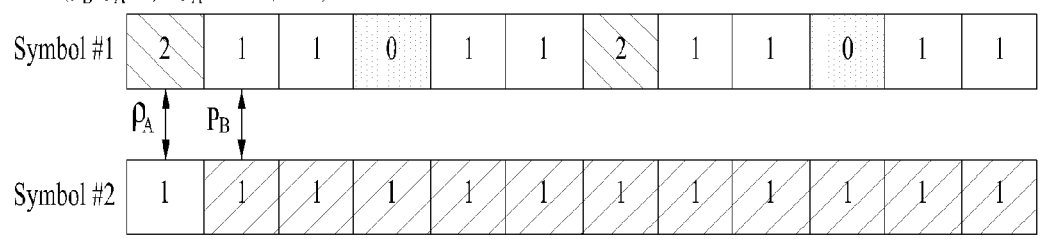
Figure 7E:
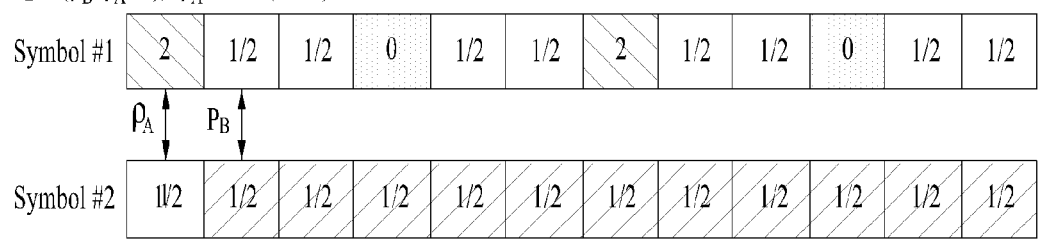

Referring to FIG. 7a, the ratio of CRS (e.g., CRS1) EPRE of symbol 1 symbol #1) to data EPRE of symbol 2 (symbol #2) can be defined as $\rho_A$, and the ratio of EPRE of symbol 1 (symbol #1) of the data EPRE of symbol 2 can be defined as $\rho_B$. Referring to FIGS. 7b to 7e, a number expressed in each symbol may indicate a power level. Referring to FIG. 7b, $\rho_A$=1 and $\sigma_B$=5/4. Thus, it can be seen from Table 3 that $P_B$ is 0. Referring to FIG. 7c, $\rho_A$=1/2 and $\rho_B$=5/8. Thus, it can be seen from Table 3 that $P_B$ is 0. Referring to FIG. 7d, $\rho_A$=1/2 and $\rho_B$=1/2. Thus, it can be seen from Table 3 that $P_B$ is 1. Referring to FIG. 7e, $\rho_A$=1/4 and $\rho_B$=1/4. Thus, it can be seen from Table 3 that PB is 1.

In the multi-antenna based FDR system, self-interference becomes more complex than a single antenna based FDR system due to multiple antennas used during transmission/reception. In more detail, the number of self-interferences to be canceled is increased in the form of multiplication of increase of the number of antennas.

Figure 8:
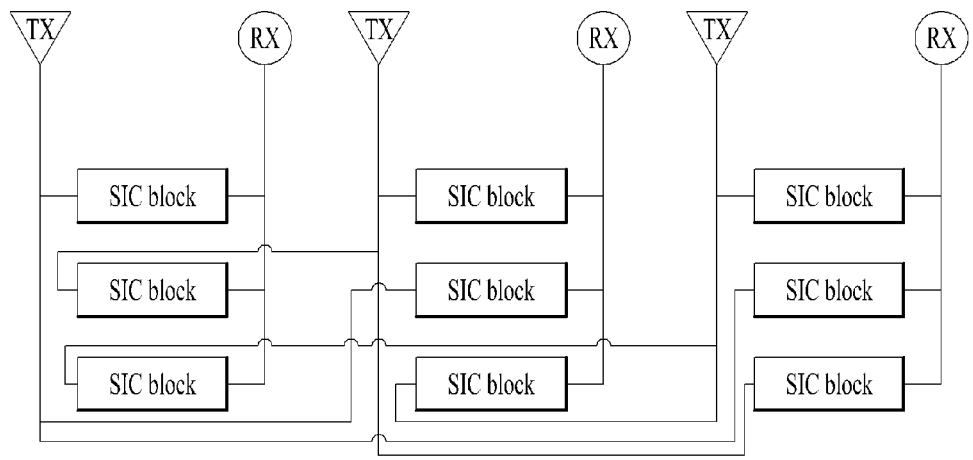
FIG. 8 illustrates an example of a self-interference cancellation (SIC) block for SIC in a multi-antenna FDR system.

FIG. 8 illustrates an example of a self-interference cancellation (SIC) block for SIC in a multi-antenna FDR system.

An example of the SIC block of the FDR system that uses 3×3 multiple antennas is show in FIG. 8. As shown in FIG. 8, interference between multiple antennas occurs in the multi-antenna based FUR system. To solve this interference, self-interference may be performed in an antenna domain using a rat race coupler (RRC).

Figure 9:
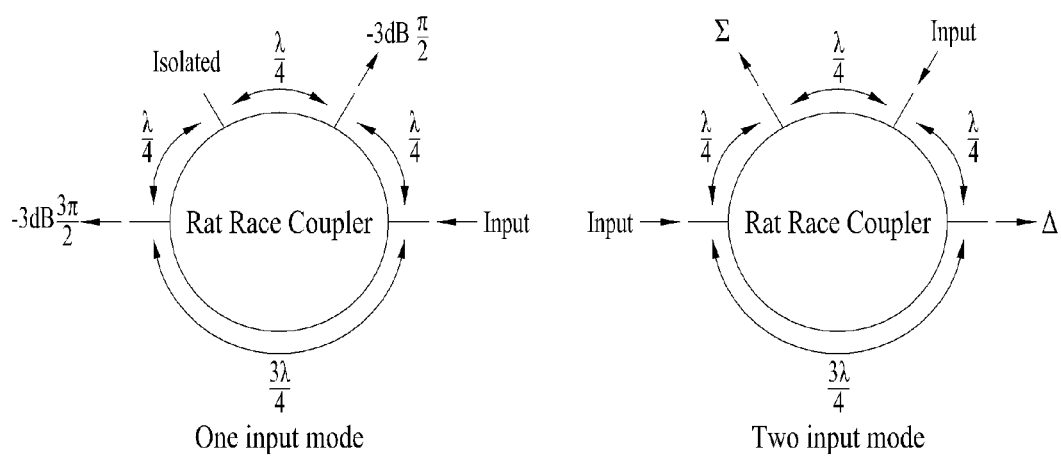
FIG. 9 is a diagram illustrating the principle of a basic operation of a rat race coupler (RRC).

FIG. 9 is a diagram illustrating the principle of a basic operation of a rat race coupler (RRC).

The rat race coupler is a device operated at four ports, and may perform transmission and reception in one input mode and two input modes. When one of the ports is used as an input port, two ports operate as output ports to send signals having a phase difference of 180 degrees, and the remaining one port operates as an isolated port (−40 dB). Alternatively, when two ports are used as input ports, the remaining two ports operate as output ports to send a sum signal and a difference signal, respectively.

Figure 10:
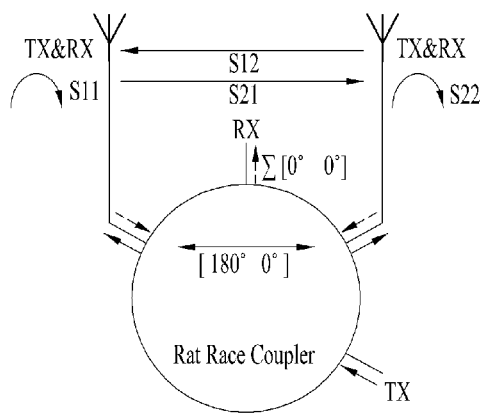
FIG. 10 is an exemplary diagram illustrating antenna arrangement and a signal power flow for self-interference cancellation using a rat race coupler.

FIG. 10 is an exemplary diagram illustrating antenna arrangement and a signal power flow for antenna self-interference cancelation using a rat race coupler.

When two antennas are used using characteristics of the rat race coupler as shown in FIG. 10, a TX path and an RX path may be isolated from each other and at the same time self-interference cancelation may be performed in an antenna domain. In more detail, during signal reception, an RX RF chain is connected to an original TX isolation port using the two input modes of the rat race coupler, whereby signals having the same phase may be received by the two antennas. During signal transmission, SI signals that return to their antennas after being generated due to antenna mismatch are S11 and S22, and SI signals between the respective antennas are S12 and S21. An SI signal finally entering the RX RF chain is S11−S22+S12−S21. Due to a characteristic of an antenna which is a passive electronic element, S12 equals to S21 irrespective of a surrounding environment. Thus, S11-S22 is an SI signal that substantially enters the RX RF chain. In this case, it is possible to obtain significantly high TX-RX isolation through passive SIC.

Figure 11:
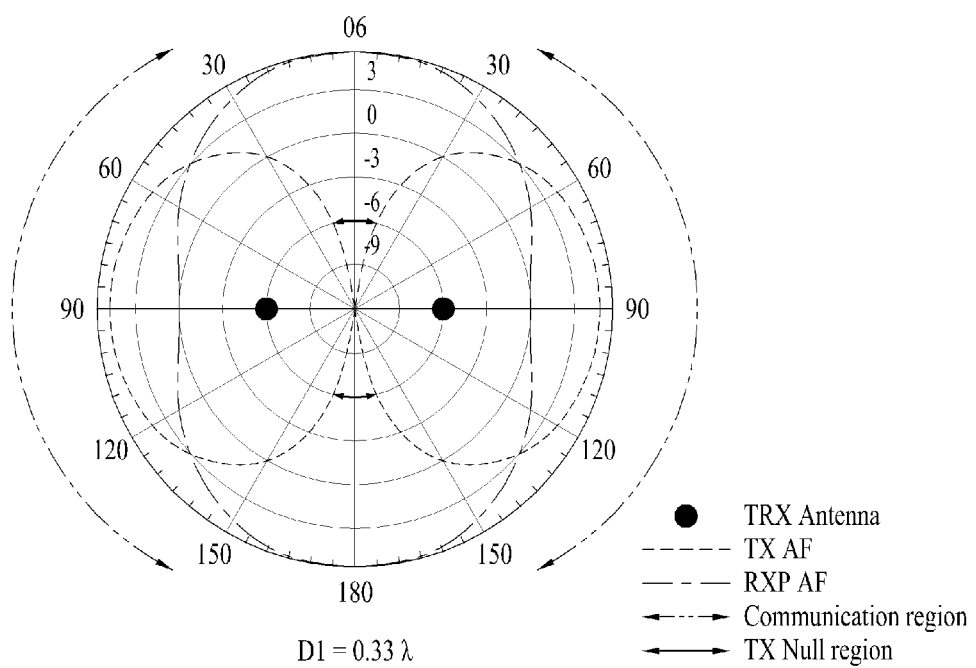
FIG. 11 is a diagram illustrating a beam gain when an interval D1 between antennas connected to a rat race coupler is set to 1/32 $\lambda$.

However, if antenna SIC is performed using the rat race coupler, main beam directions of transmission and reception are determined to be essentially different from each other as shown in FIG. 11.

FIG. 11 is a diagram illustrating a beam gain when an interval D1 between antennas connected to a rat race coupler is set to 1/32 .

As shown in FIG. 11, TX and RX beam gains are determined in accordance with a direction, and a TX null region where beam gain of TX is −9 dB or less and a communication region where beam gain of TX and beam gain of Rx are all 0 dB or more may be configured. That is, a problem may occur in the TX null region during transmission, and transmission and reception may be performed in the communication region without energy loss.

Antenna arrangement may be used in case of a multi-antenna system which uses several antennas to solve a problem that the TX beam pattern and the RX beam pattern are different from each other in the system which achieves passive SIC using an antenna pair together with the rat race coupler. That is, if a plurality of antenna pairs are arranged complementarily, a communication region which can cover a full direction may be configured as shown in FIG. 12.

Figure 12:
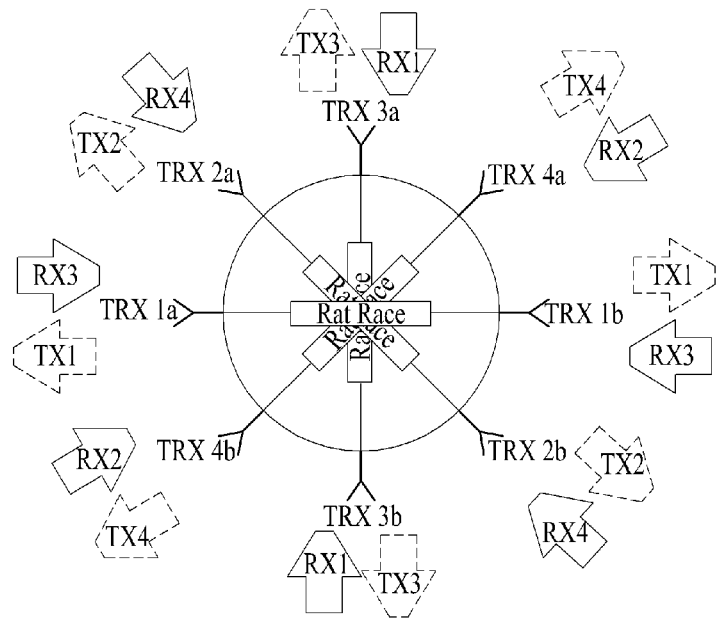
FIG. 12 is a diagram illustrating an example of a TX main beam direction and an RX main beam direction after antenna arrangement for covering a full direction when the number of antennas is 8.

FIG. 12 is a diagram illustrating an example of a TX main beam direction and an RX main beam direction after antenna arrangement for covering a full direction when the number of antennas is 8.

Antenna arrangement shown in FIG. 12 complementarily covers a full direction in each antenna pair but a problem occurs when multiple streams are transmitted using multiple antennas. That is, gain may be obtained in view of reliability which is one of two advantages that may be obtained using multiple antennas but gain in view of high throughput which is the other one of the two advantages has no choice but to be reduced. This relation is expressed as shown in FIG. 13.

Figure 13:
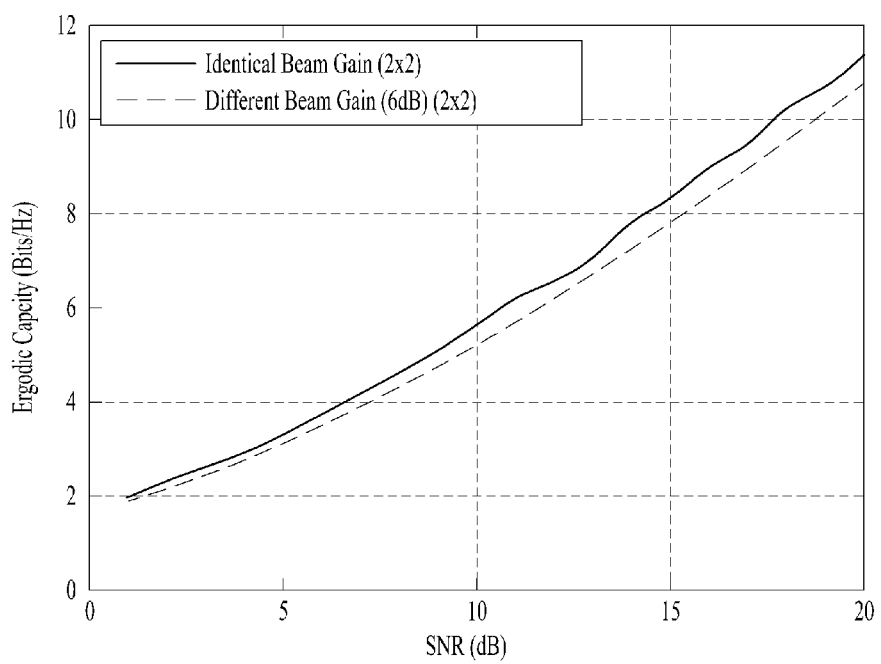
FIG. 13 is a diagram illustrating Ergodic capacity (0 dB, 6 dB) according to a position of a transmitter when a 2×2 rat race coupler is used.

FIG. 13 is a diagram illustrating Ergodic capacity (0 dB, 6 dB) according to a position of a transmitter when a 2×2 rat race coupler is used.

As shown in FIG. 13, it is noted that there is a difference of 1 bits/Hz level in case of a signal to noise ratio (SNR)=20 dB when a difference between beam gains of TX antennas is 6 dB. If the difference between beam gains of TX antennas is increased, it will be apparent that degradation of ergodic capacity becomes more serious. Therefore, a solution in view of high throughput is required in view of matching with the FDR system having different beam gains of TX antennas, such as MIMO and a rat race coupler.

The present invention is intended to increase capacity of a UE or BS, which receives a signal from a UE or BS, which operates based on a MIMO antenna based FDR system. As described above, since phases of signals transmitted from two antennas in pairs connected to each rat race coupler of the transmitter are inverted, beam gains of TX antennas are varied depending on a position of the UE which receives a signal. Therefore, it is important for a transmitter of a transmitting side which operates based on the MIMO antenna based FDR system to acquire position information of a receiver of a receiving side. There are various methods for acquiring position information. For example, angle of arrival (AoA) information of RX beam or positioning RS (PRS) and absolute position information of the receiver (or receiving end) of the receiving side (e.g., UE) may be acquired using a method for transmission to the transmitter (or transmitting end) of the transmitting side (e.g., BS) through a data channel (e.g., physical uplink shared channel (PUSCH)).

In this way, the present invention is applicable to various MIMO antenna communication system having different TX beam gains of multiple antennas depending on a direction of the receiver (or receiving end), including the rat race coupler based FUR system.

Embodiment 1: A transmitter may increase a transmission power of a TX chain to increase throughput considering a direction of a receiver, which is acquired through various methods.

Considering beam gains of TX antennas, which are different depending on a direction of a receiver, a transmission power of each TX chain may be increased such that transmission powers in the respective antennas are the same as each other. As an example, to increase transmission throughput, a transmission power of less TX antenna beam gain may be increased such that the corresponding transmission power is equal or similar to that of more TX antenna beam gain. For example, in 2×2 MIMO-FDR based on two rat race couplers, when TX antenna beam gain from one rat race coupler is −6 dB and TX antenna beam gain of the other rat race coupler is 0 dB, a transmission power of a TX chain connected to the rat race coupler having less TX antenna beam gain may be boosted to 6 dB.

Embodiment 2: A transmitter may reduce a transmission power of a TX chain to reduce a transmission power considering a direction of a receiver, which is acquired through various methods.

Considering beam gains of TX antennas, which are different depending on a direction of a receiver, a transmission power of each TX chain may be reduced such that transmission powers in the respective antennas are the same as each other. As an example, to reduce a transmission power, a transmission power of more TX antenna beam gain may be reduced such that the corresponding transmission power is equal or similar to that of less TX antenna beam gain. For example, in 2×2 MIMO-FDR based on two rat race couplers, when TX antenna beam gain from one rat race coupler is −3 dB and TX antenna beam gain of the other rat race coupler is 0 dB, a transmission power of a TX chain connected to the rat race coupler having more TX antenna beam gain may be transmitted by being reduced as much as 3 dB.

Embodiment 3: A transmitter may reduce/increase a transmission power of a TX chain to reduce or increase a transmission power considering a direction of a receiver, which is acquired through various methods.

Considering beam gains of TX antennas, which are different depending on a direction of a receiver, a transmission power of each TX chain may be increased/reduced such that transmission powers in the respective antennas are the same as each other. As an example, to minimize attenuation of transmission throughput while reducing a transmission power, a transmission power of more TX antenna beam gain may be reduced and a transmission power of less TX antenna beam gain may be increased such that the corresponding transmission power is equal or similar to a power of TX beams. For example, in 2×2 MIMO-FDR based on two rat race couplers, when TX antenna beam gain from one rat race coupler is −6 dB and TX antenna beam gain from the other rat race coupler is 0 dB, a transmission power of a TX chain connected to the rat race coupler having more TX antenna beam gain may be reduced as much as 3 dB and a transmission power of a TX chain connected to the rat race coupler having less TX antenna beam gain may be boosted to 3 dB.

Embodiment 4: A transmission power may be transmitted from the legacy rank n (in this case, n<min(the number of TX antennas and the number of RX antennas)) to rank k (in this case, k<n) if the transmission power is not controlled by the methods of the embodiments suggested as above.

One example of the case that a transmission power is not controlled may include a case that increase of the transmission power is not possible as the transmission power reaches the limit during increase of the transmission power. Another example of the case that the transmission power is not controlled may include a case that communication is not possible due to throughput attenuation during decrease of the transmission power.

Other example of the case that the transmission power is not controlled may include a case that beam gain of a TX antenna connected to the rat race coupler is a threshold value or less. In this case, the threshold value may be a rank value.

A base station (BS) operating in the FDR system may signal changed rank information to a user equipment (UE) through a downlink physical layer channel or a higher layer signal (for example, RRC signal). In opposite case, a UE operating in the FDR system may signal changed rank information to a BS through an uplink physical layer channel or a higher layer signal.

The above method may selectively operate only if the BS or the UE operates in the FDR system. The UE operating in the FDR system is connected to the BS, or a UE which desires to receive a downlink signal and a UE which desires to transmit an uplink signal desire communication at the same time, so that the BS may operate in the FDR system. At this time, the above method may selectively operate. Since downlink traffic is more than uplink traffic, some of the UEs which desire to transmit an uplink signal may operate in the FDR system. At this time, the above method may selectively operate. As an example, the BS may trigger control signal transmission of the UE to receive necessary information from the UE through a physical layer or a higher layer signal if needed by predicting a duration for an FDR operation of the UE through a buffer status report received from the UE.

Since each of the examples suggested as above may be included in one of the implementation methods of the present invention, it will be apparent that the examples may be regarded as the suggested methods. Also, although the methods suggested as above may be implemented independently, some of the methods suggested as above may be implemented in combination (or corporation). A rule may be defined such that information as to application of the methods suggested as above (information as to rules of the methods suggested as above) may be notified from the BS to the UE through a predefined signal (e.g., physical layer signal or higher layer signal).

Also, for convenience of the description, it is assumed that the above-described method is based on the 2×2 MIMO-FDR system. However, the above-described method may easily be applied to a normalized NxM MIMO-FDR (N and M are integers of 2 or greater) system.

Embodiment 5: A transmitter (e.g., BS) may be changed considering a direction of a receiver (e.g., UE), which is acquired through the above various methods, such that reception powers of TX signals may be the same as each other, whereby load may be reduced during SIC for each antenna.

Considering beam gains of TX antennas, which are different depending on a direction of a receiver, a direction of TX beams may be controlled such that transmission powers in the respective antennas are the same as each other. As an example, if a power of a desired signal received by a specific antenna in accordance with the direction of the receiver is low, an SIC algorithm of high complexity should be used to obtain a desired SIC level. On the other hand, if a power of a desired signal received by a specific antenna in accordance with the direction of the receiver is high, an SIC algorithm of low complexity should be used to obtain a desired SIC level. That is, analog SIC or digital SIC may be different for each antenna due to different RX powers caused by the direction of the receiver. An example of a status of 2×2 MIMO-FDR will be described in detail with reference to FIG. 14.

Figure 14:
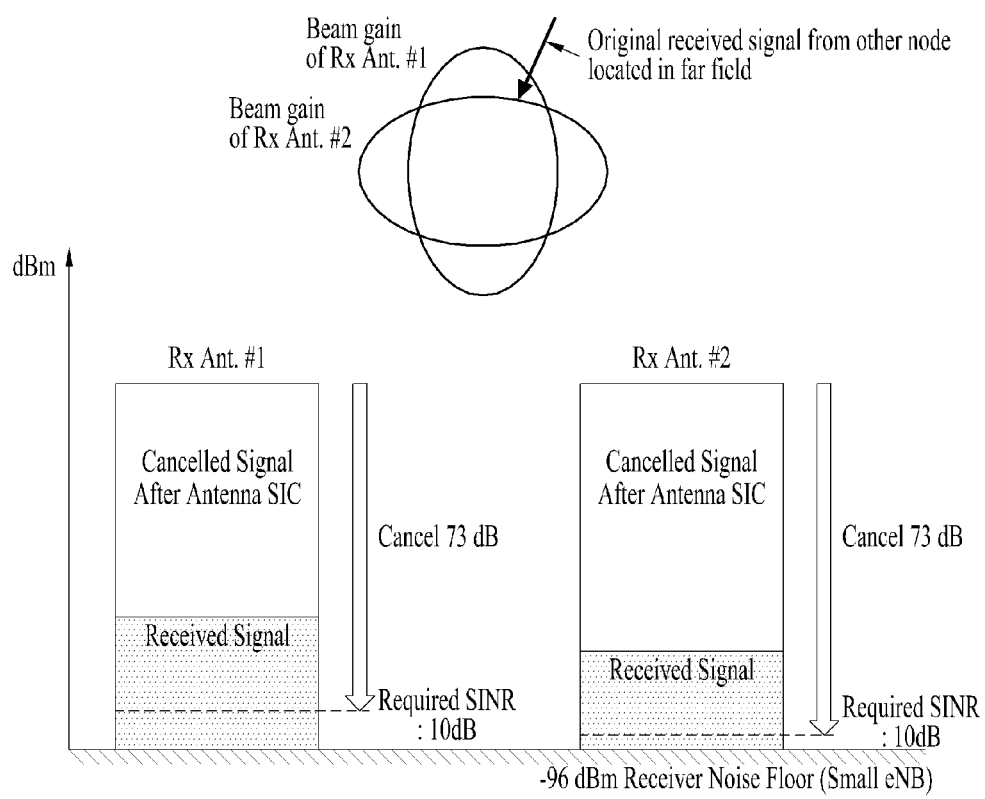
FIG. 14 is an exemplary diagram illustrating self-interference cancellation requirements when a difference of 6 dB occurs between gains of RX beams.

FIG. 14 is an exemplary diagram illustrating self-interference cancellation requirements when a difference of 6 dB occurs between gains of RX beams.

As shown in FIG. 14, Rx antenna #1 (Rx Ant #1) needs SIC of 70 dB to satisfy an SINR required when a signal received through Rx antenna #2 (Rx Ant #2) is less, as much as 6 dB, than a signal received through the Rx Ant #1 due to RX antenna beam gains different in accordance with the direction of the receiver as described above, whereas the Rx Ant #2 needs SIC of 76 dB. Non-linear digital SIC of high order may be required to obtain additional throughput of 6 dB in SIC, and additional line may be required to more increase throughput of analog SIC. That is, if a different SIC level is required for each TX antenna, since the FDR system should be designed and operated to conform to a maximum SIC level which is required, additional load therefor is required.

However, if a direction of TX beams is controlled considering the direction of the receiver, which is acquired by the transmitter, such that RX powers of TX signals are the same as each other as described above, SIC different for each antenna may not be required due to the same RX strength. One example of this case will be described in a status of 2×2 MIMO-FDR with reference to FIG. 15.

Figure 15:
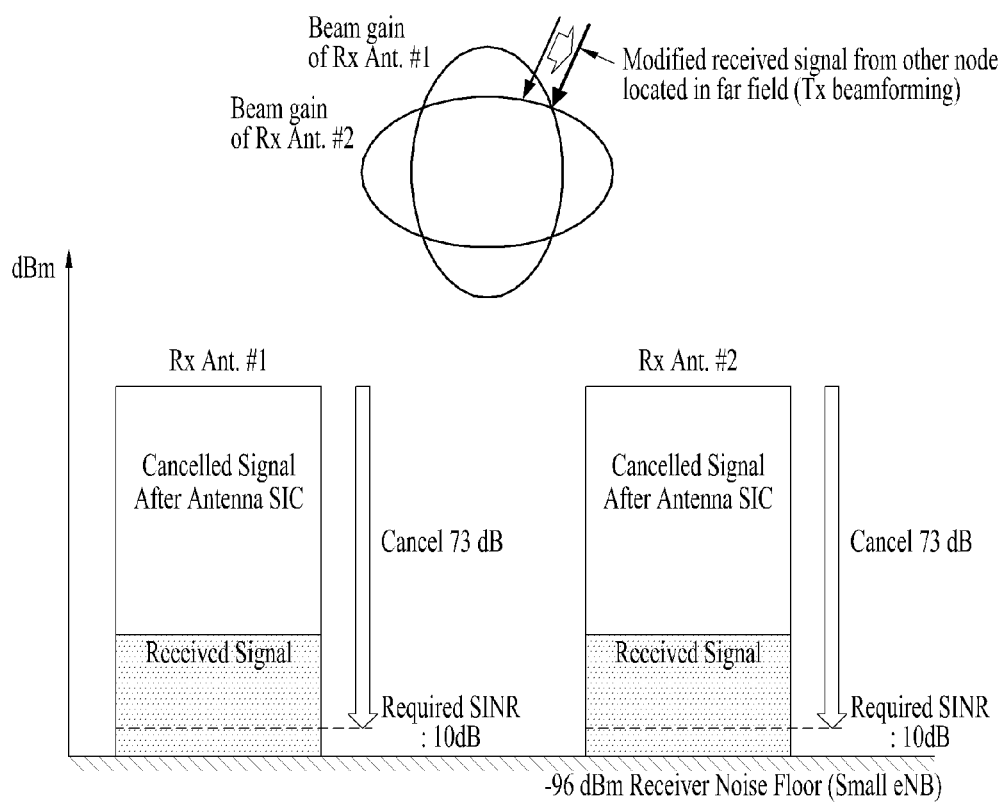
FIG. 15 is a diagram illustrating an example of self-interference cancellation requirements when beam gains of RX antennas occur equally due to transmission beamforming.

FIG. 15 is a diagram illustrating an example of self-interference cancellation requirements when beam gains of RX antennas occur equally due to transmission beamforming.

As shown in FIG. 15, when a signal received through the Rx Ant #1 becomes equal to a signal received through the Rx Ant #2 due to appropriate configuration of a direction of TX beams, SINR required through the same SIC applied to each antenna may be satisfied. Therefore, SIC different for each RX antenna may not be required by assistance of the transmitter, whereby the FDR system may be designed and operated equally for each RX antenna. An effective channel is schematized as illustrated in FIG. 16 below by using beam gains $g_1(\theta)$ and $g_2(\theta)$ per antenna according to AoA value of $\theta$ to which a TX signal is received and a radio channel $H_{2,2}$ of the transmitter (or transmitting end) and the receiver (or receiving end).

Figure 16:
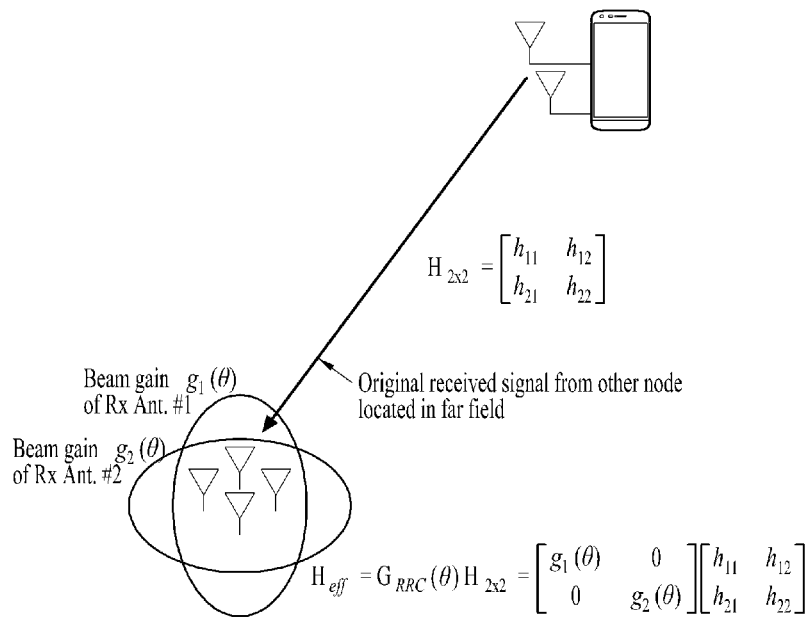
FIG. 16 is an exemplary diagram illustrating an effective channel when a difference $|g_1(\theta)-g_2(\theta)|$ occurs between RX beam gains.

FIG. 16 is an exemplary diagram illustrating an effective channel when a difference $|g_1(\theta)-g_2(\theta)|$ occurs between RX beam gains.

Figure 17:
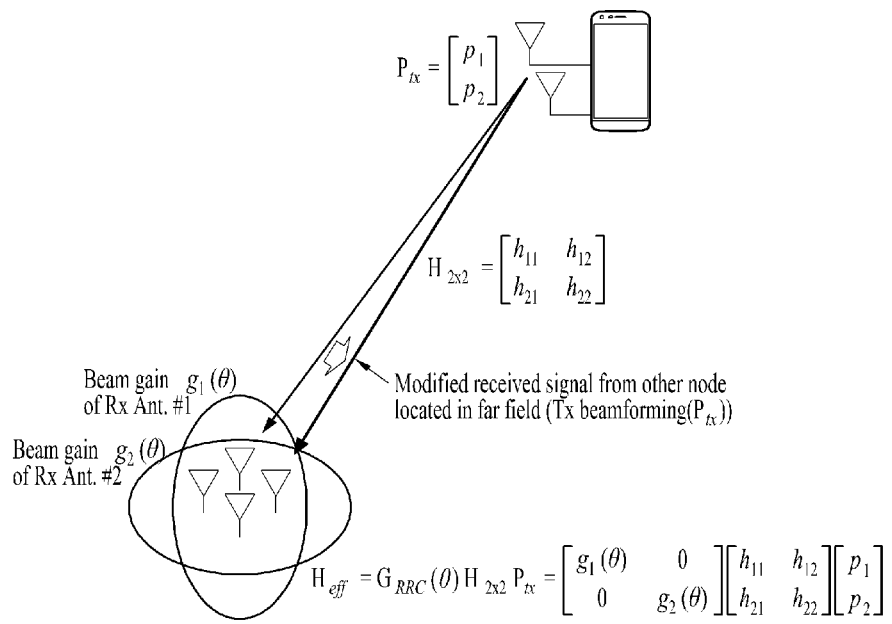
FIG. 17 is an exemplary diagram illustrating an effective channel when there is no gain difference in RX beams due to transmission beamforming.

When a TX beamforming value is set to $P_{tx}$ using the suggested method of the aforementioned description such that there is no difference between beam gains per RX antenna, an effective channel is schematized as illustrated in FIG. 17 below by using beam gains $g_1(\theta)$ and $g_2(\theta)$ per antenna according to AoA value of $\theta$ to which a TX signal is received and a radio channel $H_{2,2}$ of the transmitter and the receiver.

FIG. 17 is an exemplary diagram illustrating an effective channel when there is no gain difference in RX beams through transmission beamforming.

Various kinds of information may be required as follows to set the value $P_{tx}$ (for example, $$P_{tx} = \begin{bmatrix} p_1 \\ p_2 \end{bmatrix}$$

in case of 2×2 MIMO-FDR system). This will be described as follows, for example.

As an example, when a device operating in the FDR system to receive a signal is a UE and a device for transmitting a signal from a far end is a BS, a signal which is to be changed by beamforming is a downlink signal transmitted by the BS. To calculate beamforming of the BS, the UE should feed estimated channel (state) information (e.g., CQI index, etc.) back to the BS. The BS may determine or set a beamforming value $P_{tx}$ on the basis of the estimated channel information fed back from the UE. Afterwards, the BS may transmit a downlink signal to which the determined beamforming value is applied, such that there is no difference between RX beam gains in the UE through transmission beamforming or a difference between RX beam gains becomes a predetermined threshold value or less.

As another example, a device operating in the FUR system to receive a signal may be a BS, and a device for transmitting a signal from a far end may be a UE. This case is shown in FIG. 17. In this case, a signal which is to be changed by beamforming is an uplink signal transmitted by the UE, and the UE may calculate its beamforming value $P_{tx}$ by using channel estimation and channel reciprocity properties through a reference signal (RS) transmitted by the BS.

Alternatively, the BS may notify the UE of a value of θ which is AoA of beams, which are received through SRS (sounding reference signal or sounding reference symbol) transmitted by the UE, through a PDSCH (Physical Downlink Shared CHannel), a PDCCH(Physical Downlink Control CHannel), an ePDCCH (ehanced PDCCH), etc, whereby the UE may determine a beamforming value on the basis of the AoA value. The UE may transmit an uplink signal to which the determined beamforming value is applied, such that there is no difference between RX beam gains in the BS through transmission beamforming or a difference between RX beam gains becomes a predetermined threshold value or less.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The method for reducing an operation for self-interference cancelation in an FDR environment and the device therefor are industrially applicable to various wireless communication systems such as 3GPP LTE-A and 5G system.

What is claimed is:

1. A method for reducing an operation for self-interference cancellation by a user equipment (UE) in a full duplex radio (FDR) environment, the method comprising:
    performing channel estimation for a downlink signal transmitted from a base station (BS);
    determining a beamforming value for transmission beamforming based on channel reciprocity property as a result of the channel estimation; and
    transmitting an uplink signal by applying the determined beamforming value,
    wherein the determined beamforming value is a value determined to cancel a difference between reception (RX) beam gains per RX antenna of the BS.

2. The method of claim 1, wherein the determined beamforming value is applied per transmission (TX) antenna of the UE.

3. A base station (BS) for performing communication to reduce an operation for self-interference cancellation in a full duplex radio (FDR) environment, the BS comprising:
    a receiver configured to receive estimated channel state information from a user equipment (UE);
    a processor configured to determine a beamforming value for transmission beamforming based on the received channel state information; and
    a transmitter configured to transmit a downlink signal by applying the determined beamforming
    wherein the determined beamforming value is a value determined to cancel a difference between reception (RX) beam gains per RX antenna of the BS.

4. A user equipment (UE) for performing communication to reduce an operation for self-interference cancellation in a full duplex radio (FDR) environment, the UE comprising:
    a processor configured to:
    perform channel estimation for a downlink signal transmitted from a base station (BS); and
    determine a beamforming value for transmission beamforming based on channel reciprocity property as a result of the channel estimation; and
    a transmitter configured to transmit an uplink signal by applying the determined beamforming value,
    wherein the determined beamforming value is a value determined to cancel a difference between reception (RX) beam gains per RX antenna of the BS.

5. The UE of claim 4, wherein the determined beamforming value is applied per transmission (TX) antenna of the UE.

* * * * *